United States Patent
Miyajima et al.

(10) Patent No.: US 7,038,642 B2
(45) Date of Patent: May 2, 2006

(54) DISPLAY DEVICE

(75) Inventors: Yasushi Miyajima, Gifu (JP); Ryoichi Yokoyama, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 337 days.

(21) Appl. No.: 10/390,885

(22) Filed: Mar. 19, 2003

(65) Prior Publication Data
US 2003/0202149 A1    Oct. 30, 2003

(30) Foreign Application Priority Data
Apr. 24, 2002   (JP)   .................. 2002-122147

(51) Int. Cl.
G09G 3/36    (2006.01)

(52) U.S. Cl. .................. 345/87; 345/206
(58) Field of Classification Search ............ 345/87, 345/206
See application file for complete search history.

(56) References Cited

U.S. PATENT DOCUMENTS

| 6,177,916 B1 * | 1/2001 | Aoki et al. .......... 345/87 |
| 6,590,229 B1 | 7/2003 | Yamazaki et al. |
| 2002/0123175 A1 | 9/2002 | Yamazaki et al. |

* cited by examiner

*Primary Examiner*—Sumati Lefkowitz
*Assistant Examiner*—Ke Xiao
(74) *Attorney, Agent, or Firm*—Morrison & Foerster LLP

(57) ABSTRACT

The peripheral driving circuit has a multiple layer configuration that includes the layers used for the display pixel element, for example, the layers of the pixel element electrode and the light-blocking layer. For example, the various bus lines are formed using the same layer as the layer of the pixel element electrode. The peripheral driving circuit is formed using the layers below the pixel element electrode including the layer of gate electrode, the layer of the data line, the active layer of the TFT, and the light-blocking layer. This increases the flexibility of the disposition of the bus lines, leading to the improved design flexibility. The multiple layer configuration of the display device increases the flexibility of the pattern layout for the peripheral driving circuits.

6 Claims, 5 Drawing Sheets

DISPLAY DEVICE

BACKGROUND OF INVENTION

1. Field of the Invention

This invention relates to a display device, especially to a technology for reducing display device size by improving layout flexibility of peripheral driving circuits.

2. Description of the Related Art

A flat panel display device including a reflection type active matrix liquid crystal display device (referred to as LCD hereinafter) can be thin, small and light, and it operates with low-power consumption. The LCD has been used as a display part in various devices such as mobile information device. The LCD, whose pixel has a switching element and a thin film transistor, is known as an active matrix type. The panel of the active matrix display device is highly reliable for maintaining displayed contents of the pixels, which provides the active matrix display device with high display quality.

FIG. 5 shows an equivalent circuit of a pixel in the active matrix LCD. Each pixel has a thin film transistor (TFT) 11 connected to a gate line and a data line. When the TFT 11 is turned on by a selection signal outputted to the gate line, the data corresponding to the display content is supplied to a liquid crystal capacitance (Clc) 15 from the data line through the TFT 11. It is necessary to accurately keep the display data from the time when the TFT 11 is first selected for writing to the time when the TFT 11 is selected again in the next sequence. Therefore, a storage capacitance (Csc) 13 is connected to the TFT 11 in series with the liquid crystal capacitance Clc 15.

FIG. 6 is a plan view showing the configuration of a LCD panel 300 as a whole. A display region 100 is disposed in the middle of the LCD panel 300. The display pixels are disposed in a matrix configuration on the display region 100. And peripheral driving circuits including an H scanner (a horizontal driving circuit) 101, a HSW circuit 102, a PSW circuit 103, a V scanner (a vertical driving circuit) 104 and a group of input terminals 105 are disposed near the inside wall of the display region 100.

The H scanner 101 generates a horizontal scanning signal. The HSW circuit 102 is a switching circuit for supplying a video signal to the data line based on the horizontal scanning signal. The PSW circuit 103 is a switching circuit, which is connected to all the data lines and turns them on and off simultaneously. When the PSW circuit 103 is on, it supplies a pre-charge data (pre-charge signal) from a pre-charge bus line to all the data lines. The V scanner is a circuit for outputting a vertical scanning signal, which becomes high for each of the horizontal period, as the selection signal described above is applied to the gate line.

An HVDD (a source voltage for the H scanner), a VSS (an earth voltage), the precharge data, a VVDD (a source voltage for the V scanner) and a VCOM (a common voltage) are inputted from the group of input terminals 105, and an HVDD bus line 110, a VSS bus line 111, the pre-charge data bus line 112, a VVDD bus line 113, and a Com bus line 114 corresponding to the above mentioned voltages are disposed near the inside wall of the LCD panel 300. These bus lines 110–114 supply the data and the voltages necessary for peripheral driving circuits.

However, since the peripheral driving circuits are disposed in a wiring layer, which is the same as a poly-silicon layer or an aluminum wiring layer of the TFT, there is a certain restriction in terms of the pattern layout. Additionally, it is necessary to reduce the time constant of the various bus lines 110–114. Therefore, for a larger LCD panel, a wider wiring area is required, enlarging the framing area of the LCD panel 300.

SUMMARY OF THE INVENTION

The invention provides a display device that includes a display region with a plurality of display pixels, a peripheral driving circuit that supplies a driving signal to each of the display pixels and disposed outside the display region, and a thin film transistor disposed for each of the display pixels. The display device also includes a pixel electrode disposed for each of the display pixels. A pixel voltage is applied to the pixel electrode through the corresponding thin film transistor. The display device further includes a light-blocking layer disposed under each of the thin film transistors, and a first insulating layer having the light-blocking layers therein. The peripheral driving circuit comprises a plurality of layers and one of the layers is the first insulating layer of the light blocking layers.

The invention also provides a display device that includes a display region with a plurality of display pixels, a peripheral driving circuit that supplies a driving signal to each of the display pixels and disposed outside the display region, and a thin film transistor disposed for each of the display pixels. The display device also includes a pixel electrode disposed for each of the display pixels. A pixel voltage is applied to the pixel electrode through the corresponding thin film transistor. The display device further includes a storage capacitance element disposed for each of the display pixels, which has a first electrode disposed in a first insulating layer located above an active layer of the corresponding thin film transistor and a second electrode disposed in a second insulating layer located below the active layer. The peripheral driving circuit includes the first insulating layer of the first electrode and the second insulating layer of the second electrode.

DETAILED DESCRIPTION OF THE INVENTION

Figure 1:
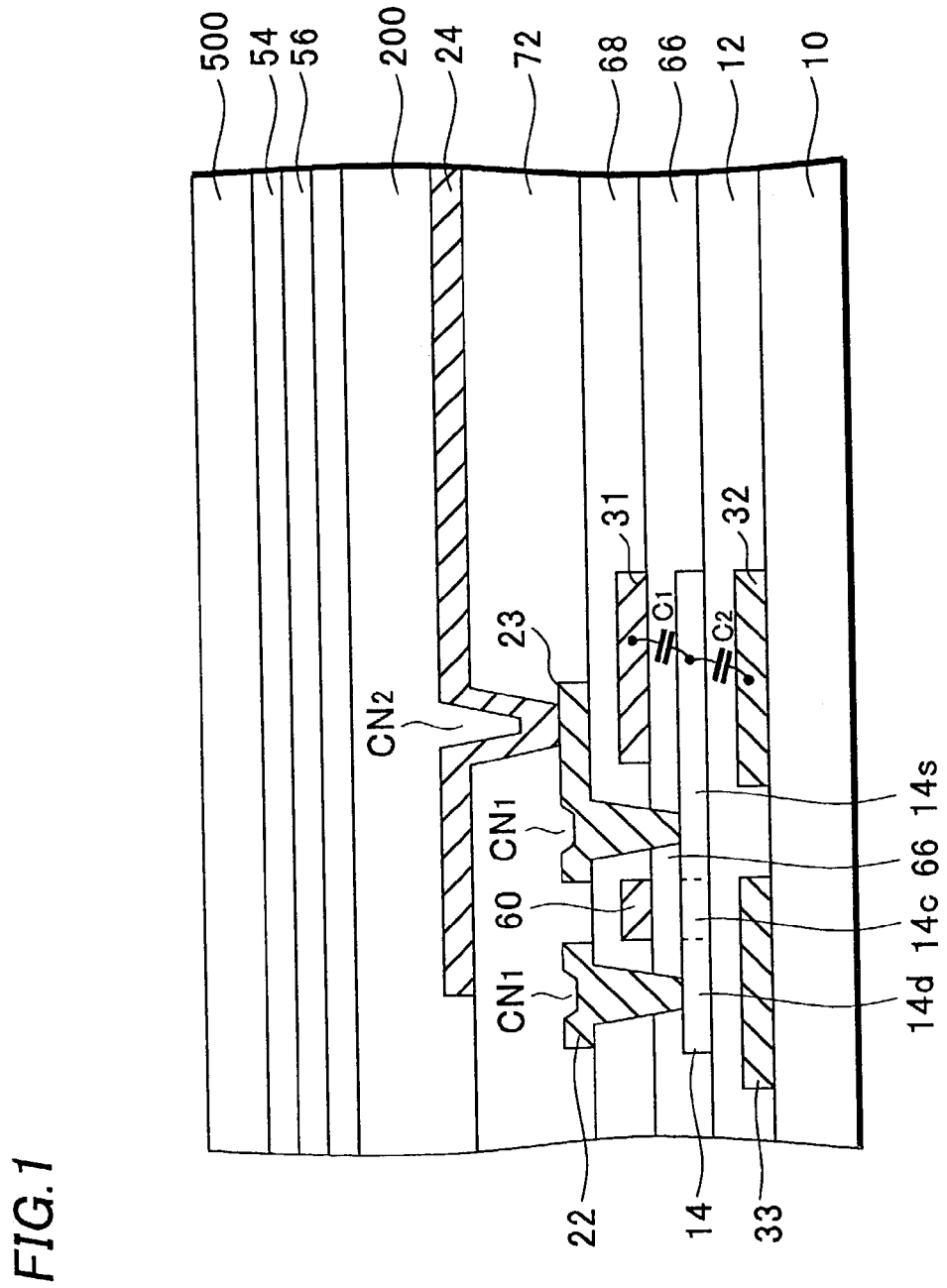
FIG. 1 is a cross-sectional view of a display pixel in an active matrix LCD of an embodiment of this invention.

An embodiment of this invention will be explained in detail by referring to FIGS. 1–5. A LCD device will be described as an example, though this invention may be applicable to other type of display device. FIG. 1 is a cross-sectional view of a display pixel in an active matrix LCD of this embodiment.

The LCD has a first substrate 10 made of transparent insulating material such as glass, a second substrate 500 and a liquid crystal 200 placed between the two substrates.

Figure 5:
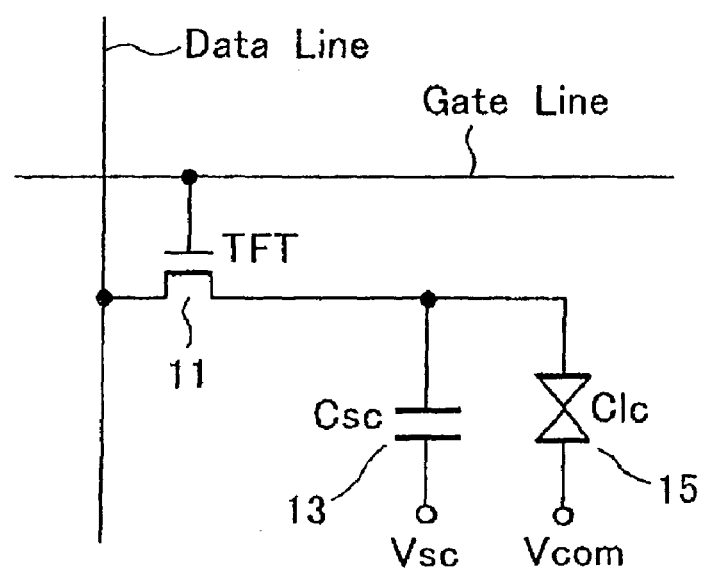
FIG. 5 is a circuit diagram of an equivalent circuit of a display pixel of the active matrix LCD.
Figure 6:
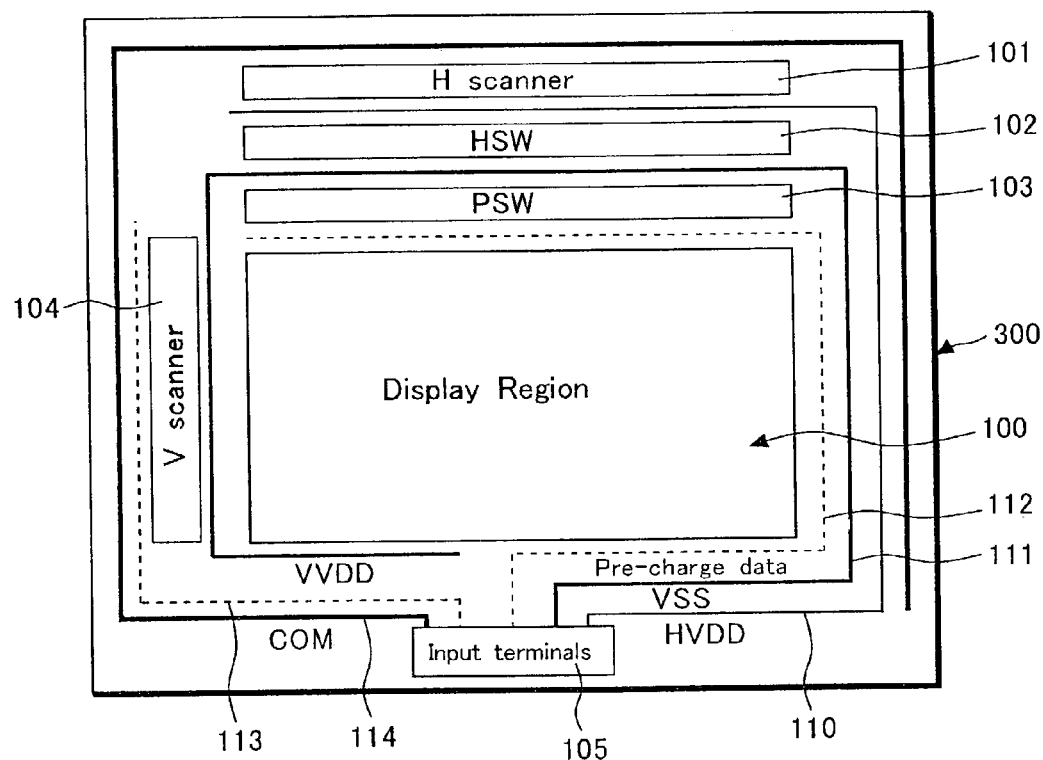
FIG. 6 is a plan view of a conventional LCD panel.

An equivalent circuit of each of pixels is shown in FIG. 5 described above. Pixel electrodes 24 are disposed on the first substrate 10 as seen from FIG. 1. A top gate type TFT is placed for each of the pixel electrodes 24.

A gate insulating layer 66 is formed on a channel region 14c disposed in an active layer 14 (for example, a polysilicon layer) of the TFT. And a gate electrode 60 (for example, a molybdenum layer) is formed on the gate insulating layer 66. The gate electrode 60 is covered with an interlayer insulating layer 68. Also, a drain 14d of the active layer 14 is connected to a data line 22 extending in a row direction through a contact hole CN1 formed in the gate insulating layer 66 and the interlayer insulating layer 68.

A source 14s of the active layer 14 is connected to an electrode 23 through a contact hole formed in the gate insulating layer 66 and the interlayer insulating layer 68. The electrode 23 is connected to the pixel electrode 24 (for example, a reflection electrode made of an aluminum layer) located in an upper layer through a contact hole CN2 formed in a thick flattening insulating layer 72 (with a thickness of 1.2 μm).

Also, the source 14s of the active layer 14 is connected to a storage capacitance element Csc. The source 14s of the active layer 14 is highly doped with an n-type impurity, and can be used as a capacitance electrode. The storage capacitance element Csc is configured from two storage capacitance elements C1 and C2 formed on both sides of the source 14s of the active layer 14 in series.

The storage capacitance element C1 includes the source 14s of the active layer 14 and the electrode 31 located in the insulating layer 68 that is above the gate insulating layer 66. Accordingly, the gate insulating layer is disposed between the electrode 31 and the active layer 14. The electrode 31 is formed in the same layer as the layer where the gate electrode 60 is formed. The storage capacitance element C2 includes the source 14s of the active layer 14 and the electrode 32 located in the insulating layer 12 that is above the first substrate 10. Accordingly, the insulating layer 12 is disposed between the active layer 14 and the electrode 32. The electrode 32 is formed in the same layer as the layer where a light-blocking layer 33 (for example, a Cr layer) for blocking the light coming from the first substrate 10 side is formed.

The electrode 31 in the upper layer and the electrode 32 in the lower layer are fixed at a predetermined voltage. For this purpose, the electrode 31 and the electrode 32 are connected through a contact hole not shown in the figure, and the predetermined voltage is supplied to the connecting wire.

Since the storage capacitance element Csc is configured from the two storage capacitance elements C1 and C2 connected in series to the source 14s of the active layer 14, the storage capacitance quantity per unit device area is larger compared to the case where only one storage capacitance element is connected. When the gate insulating layer 66 and the insulating layer 12 have the same thickness (for example, 0.1 μm), the storage capacitance quantity per unit device area is doubled. Therefore, it is possible to make the area for the storage capacitance element smaller, leading to the improved aperture ratio of the display pixel.

A common electrode 56, to which a common voltage VCOM is applied, and a color filter 54 are disposed on the second substrate 500, which is disposed facing to the first substrate 10. The liquid crystal 200 aligns itself according to the voltage applied between each of the pixel electrodes 24 and the common electrode 56 facing each other with the liquid crystal 200 between them, providing the liquid crystal display.

Figure 2:
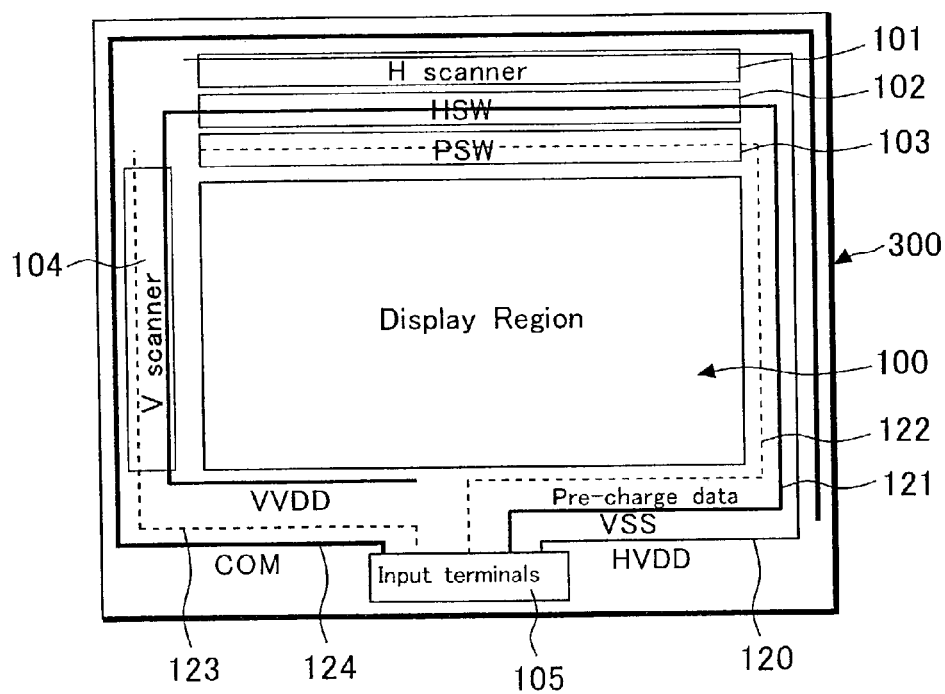
FIG. 2 is a plan view of the LCD panel of the embodiment of this invention.

FIG. 2 shows a whole view of an LCD panel 300 of this embodiment. A display region 100 is disposed in the middle of the LCD panel 300. The display pixels shown in FIG. 1 are disposed in a matrix configuration on the display region 100. Peripheral driving circuits including an H scanner 101, an HSW circuit 102, a PSW circuit 103, a V scanner 104 and other elements and a group of input terminals 105 are disposed around the display region 100.

An HVDD (a source voltage for the H scanner), a VSS (an earth voltage), a precharge data, a VVDD (a source voltage for the V scanner) and a VCOM (a common voltage) are inputted from the group of input terminals 105, and an HVDD bus line 120, a VSS bus line 121, a pre-charge data bus line 122, a VVDD bus line 123, and a COM bus line 124 corresponding to the above-mentioned voltages are disposed near the inside wall of the LCD panel 300. These various bus lines 120–124 supply the data and the voltages necessary for the peripheral driving circuits.

A feature of this embodiment is to form the peripheral driving circuits in multiple layers by using the layers of the display pixel, for example, the layer of the pixel electrode 24 and the light-blocking layer 33. For example, the various bus lines 120–124 are formed in the same layer as the layer of the pixel electrode 24. And the peripheral driving circuit is formed by using layers below the layer of the pixel electrode 24, for example, the layer of the gate electrode 60 (molybdenum layer), the data line 22 (aluminum layer), the active layer 14 of the TFT, and the light-blocking layer 33 (chrome layer). The multiple-layer configuration of the peripheral driving circuits makes the framing area of the LCD panel even smaller. Also, it is possible to dispose the various bus lines 120–124 around the display region 100 with a great flexibility, leading to the improved design flexibility.

Also, it is possible, for example, to superimpose the HVDD bus line 120 on the H scanner 101, the VSS bus line 121 on the HSW circuit 102 and the V scanner 104, the precharge data bus line 122 on the PSW circuit 103, and the VVDD bus line 123 on the V scanner 104. In this manner, the area of the peripheral region (framing area) of the LCD panel 300 can be reduced, minimizing the size of the LCD panel 300 as a whole, while keeping the size of the display region 100 at a maximum size possible.

Some peripheral driving circuits have a capacitance element as a circuit element. The area for the peripheral driving circuit can be reduced by using a capacitance element that has the same configuration as that of the storage capacitance element Csc of the display pixel described above. As an example of the peripheral driving circuit with this construction, a negative voltage source generating circuit for AC driving will be described by referring to FIG. 3.

The amplitude of an image signal and the driving voltage are reduced through the AC driving of the common voltage applied to the common electrode 56, leading to the low power consumption. When the common voltage applied to the electrode 56 is shifted from the High side to the Low side, the stored pixel voltage becomes lower than the ground level, causing a leak. Therefore, the negative voltage source generating circuit is required for keeping the voltage of the gate line in order to prevent this problem.

Figure 3:
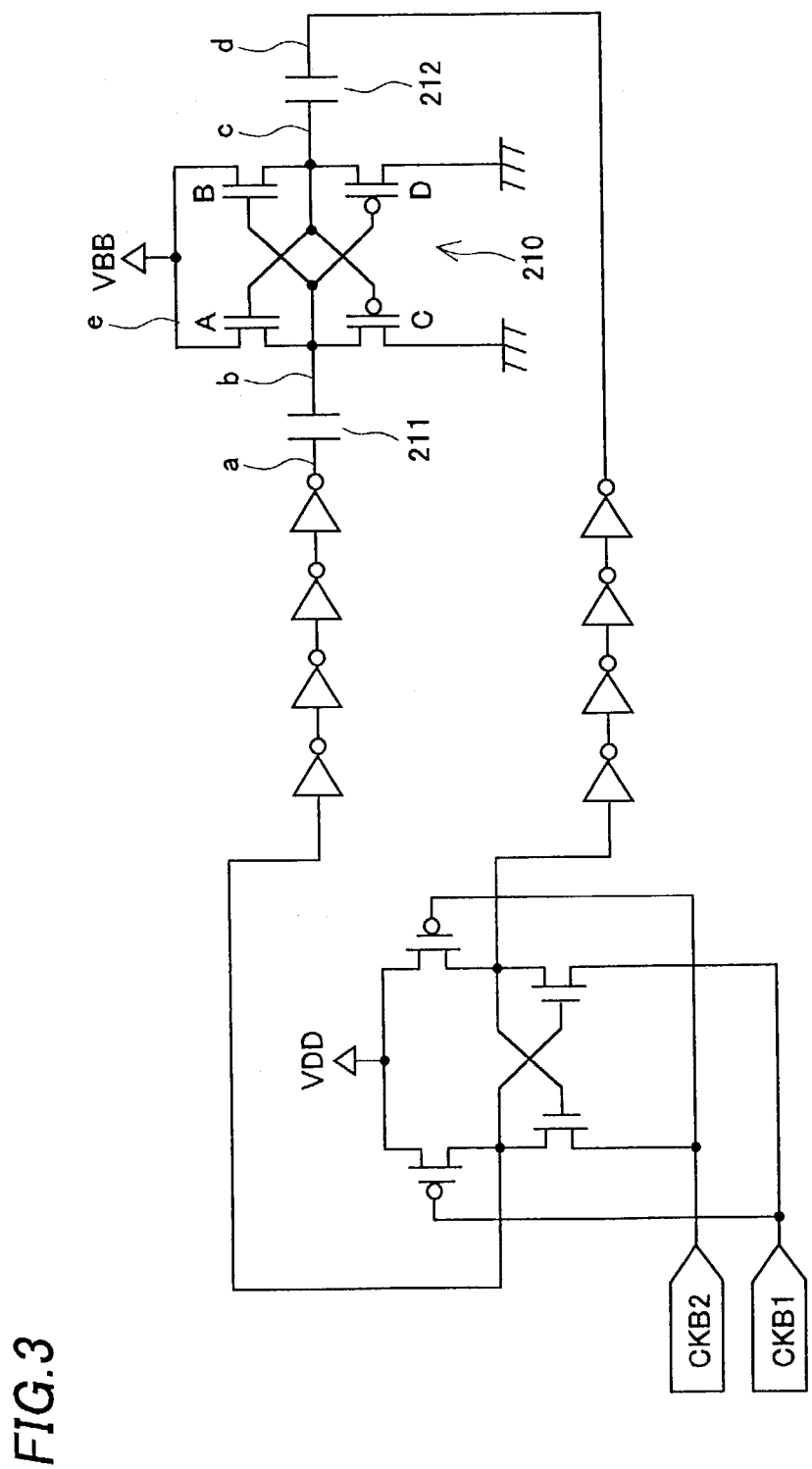
FIG. 3 is a circuit diagram of a negative voltage source generating circuit of the embodiment of this invention.

The negative voltage source generating circuit is the circuit that generates a negative voltage VBB based on input clocks CKB1 and CKB2, which have the opposite phases from each other, as seen from FIG. 3. The negative voltage source generating circuit is configured from a charge pump 210 including a pair of capacitance elements 211 and 212. In the figure, a transistor (TFT) A and a transistor (TFT) B are N-channel type, and a transistor (TFT) C and a transistor (TFT) D are P-channel type. According to this configuration, the clocks with the opposite phases are inputted to input nodes a and d of the capacitance elements 211 and 212, generating the negative voltage VBB through the operation described below.
1) When +8V is inputted to the node "a" and 0V to the node "d," the node "b" receives +8V and the node "c" receives 0V, turning the transistor B and C on. Then, the node b receives 0V and the node "e" also receives 0V.
2) Next, 0V is inputted to the node "a" and +8V to the node "d", the node "b" receives −8V and the node c receives +8V, turning the transistors A and D on. The negative charge kept in the node "b" goes to the node "e" of an output terminal, and the node "e" and the node "b" receive slightly negative voltage. The node c receives almost 0V because the electric charge goes through.
3) Next, +8V is inputted to the node "a" and 0V to the node "d", the node "b" receives +8V and the node c receives −8V, turning the transistors B and C on. The negative charge kept in the node "c" goes to the node "e", and the node "e" and the node "c" receive negative voltage. The node "b" receives almost 0V because the electric charge goes through.
4) Repeating the operations 2)–3) described above makes the negative charge gradually accumulated in the node "e", and the negative charge reaches the negative voltage of −8V.

Figure 4:
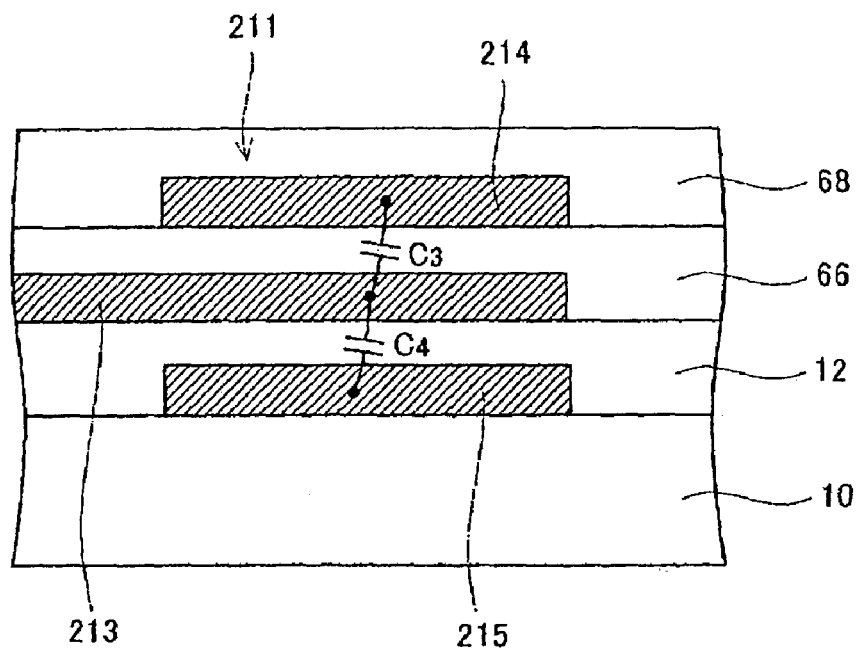
FIG. 4 is a cross-sectional view of a capacitance element of the negative voltage source generating circuit of the embodiment of this invention.

The large capacitance of about 30 pF is required for each of the capacitance elements 211, 212 in order to realize the operation described above. The capacitance elements 211 and 212 are formed in the same manner as that of the storage capacitance element Csc of the display pixel, as shown in FIG. 4.

That is, each of the capacitance elements 211, 212 is configured from two capacitance elements C3 and C4 connected in series. The capacitance element C3 is configured from an electrode 213 (an n+ layer in the same layer as the source 14s of the active layer 14) and an electrode 214 in the upper layer (in the same layer as the electrode 31) with the gate insulating layer 66 between them. The storage capacitance element C4 is configured from the electrode 213 and the electrode 215 in the lower layer (in the same layer as the electrode 32) with an insulating layer between them.

The electrode 214 in the upper layer and the electrode 215 in the lower layer are fixed at a predetermined voltage. For this purpose, the electrode 214 and the electrode 215 are connected through a contact hole not shown in the figure, and the predetermined voltage is supplied to the connecting wire. The multiple layer configuration of the capacitance elements can increase the capacitance quantity per unit device area, leading to the reduction of the pattern area.

According to this embodiment, not only the electrode 31, but also the electrode 32 in the same layer as the layer of the light-blocking layer 33 is used for configuring the storage capacitance Csc in the display pixel. Additionally, the peripheral driving circuit can be minimized by using the layer of the light-blocking layer 33 also for the peripheral driving circuit.

Since the light-blocking layer 33 does not supply signals, the insulating layer 12 is formed thin. Therefore, the capacitance element with a large capacitance can be obtained by forming the capacitance element between the layer of the light-blocking layer 33 and the active layer 14 through the insulating layer. The light-blocking layer, along with the active layer 14, is a suitable layer to form the capacitance element.

What is claimed is:

1. A display device comprising:
a display region comprising a plurality of display pixels;
a peripheral driving circuit that supplies a driving signal to each of the display pixels and is disposed outside the display region;
a thin film transistor disposed for each of the display pixels;
a pixel electrode disposed for each of the display pixels, a pixel voltage being applied to the pixel electrode through the corresponding thin film transistor;
a light-blocking layer disposed under each of the thin film transistors;
a first insulating layer having the light-blocking layers therein; and
a storage capacitance element disposed for each of the display pixels, the storage capacitance element comprising a first electrode disposed in a second insulating layer located above an active layer of the corresponding thin film transistor and a second electrode disposed in the first insulating layer,
wherein the peripheral driving circuit comprises a plurality of insulating layers each including metal wiring therein, and the peripheral driving circuit includes the first insulating layer of the light-blocking layers and the second insulating layer of the first electrode as two of the insulating layers of the peripheral driving circuit.

2. The display device of claim 1, wherein a capacitance element of the peripheral driving circuit comprises a first capacitance element electrode disposed in the first insulating layer and a second capacitance element electrode disposed in the second insulating layer.

3. The display device of claim 2, wherein an extension of the active layer of the thin film transistor is disposed between the first and second capacitance element electrodes of the peripheral driving circuit.

4. A display device comprising:
a display region comprising a plurality of display pixels;
a peripheral driving circuit that supplies a driving signal to each of the display pixels and is disposed outside the display region;
a thin film transistor disposed for each of the display pixels;
a pixel electrode disposed for each of the display pixels, a pixel voltage being applied to the pixel electrode through the corresponding thin film transistor;
a storage capacitance element disposed for each of the display pixels, the storage capacitance element comprising a first electrode disposed in a first insulating layer located above an active layer of the corresponding thin film transistor and a second electrode disposed in a second insulating layer located below the active layer,
wherein the peripheral driving circuit comprises a plurality of insulating layers each including metal wiring therein, and each of the first and second insulating layers is one of the insulating layers of the peripheral driving circuit.

5. The display device of claim 4, wherein a capacitance element of the peripheral driving circuit comprises a first capacitance element electrode disposed in the first insulating layer and a second capacitance element electrode disposed in the second insulating layer.

6. The display device of claim 5, wherein an extension of the active layer of the thin film transistor is disposed between the first and second capacitance element electrodes of the peripheral driving circuit.

* * * * *